INVENTORS
JACK L. KELLY
RONALD K. WIANDT

BY Thomas A. Briody
ATTORNEY

INVENTORS
JACK L. KELLY
RONALD K. WIANDT

BY Thomas A. Briody
ATTORNEY

RECORDING APPARATUS

Filed Feb. 8, 1967 3 Sheets-Sheet 3

INVENTORS
JACK L. KELLY
RONALD K. WIANDT

BY Thomas A. Briody
ATTORNEY 3,521,889
RECORDING APPARATUS
Jack L. Kelly and Ronald K. Wiandt, Decatur, Ill., assignors to General Electric Company, a corporation of New York
Filed Feb. 8, 1967, Ser. No. 614,585
Int. Cl. G11b *1/00, 3/00, 3/02*
U.S. Cl. 274—9 3 Claims

ABSTRACT OF THE DISCLOSURE

A portable recording device with a one-piece multifunctional slidable control element. This element is structured for cooperation with a support so that it includes a first portion which is manually engageable, a second portion slidably cooperable with a support for guiding movement of the element, a third portion slidably coactable with a motion transmission means for controlling "pause" of the device, and a fourth portion slidably coactable with the motion transmission means for effecting a detent function of the element.

This invention relates to phonograph devices, and more particularly to an improved control mechanism for a portable recording and reproducing apparatus of the type wherein a disc is embossed by a recording head which forms a spiral sound track upon the surface of the disc.

There are many occasions when persons in different occupations, such as housewives and business men, find need for quickly and conveniently recording messages or letters. For such a purpose, it is important that the recording device be sturdy, durable, portable, and very compact in size. It is also desirable that such a device should be extremely simplified in operation, thereby enabling virtually anyone to readily and efficiently utilize the equipment. Within the framework of such thinking as this, such a recording device usually includes a "pause" actuating mechanism, and it is very advantageous in designing the device to provide such a mechanism which is efficient in use and includes a minimum number of parts, thereby contributing to an economical overall device.

Accordingly, it is an important object of the present invention to provide an improved, compact, and portable phonograph device.

It is still another object of this invention to provide an improved portable recording and reproducing apparatus of the embossable disc type, which incorporates a novel "pause" actuating mechanism.

It is still a further object of our invention to provide an actuating mechanism that includes a multifunctional control element which receives actuating force, transmits this force to perform an actuating function, and guides itself for movable cooperation with an associated support.

In accordance with the present invention, in one form thereof, there is provided a portable recording apparatus for embossable disc type records, which apparatus incorporates an improved and novel pause actuating mechanism. The apparatus includes a support and a turntable arranged on the support. A motor driven element is also disposed on the support, and there is a means provided for transmitting motion from the motor driven element to the turntable. With this basic structure, a control element is arranged in selective engagement with the motion transmission means to move the motion transmission means either into or out of concurrent engagement with the turntable and the motor driven element. The control element is of one piece construction, and it includes a manually engageable first portion that is operated by the user of the system, a second portion in movable cooperation with the support for guiding the selective motion of the control element, and a third portion adapted to engage the motion transmission means for selectively operating or inactivating the turntable. Thus, by means of only a single actuating element, at least three functions are achieved. In addition, the improved control element of this invention also includes an integral detent surface for helping to control the position of the element in each of its pre-selected locations.

By further aspects of the present invention, additional desirable features may be included in the phonograph device and its pause mechanism, and the specification concludes with claims particularly pointing out and distinctly claiming the subject matter which we regard as our invention. The invention, however, as to organization and method of operation, together with further objects and advantages thereof, may best be understood by reference to the following description, when taken in conjunction with the accompanying drawings, in which:

Figure 1:
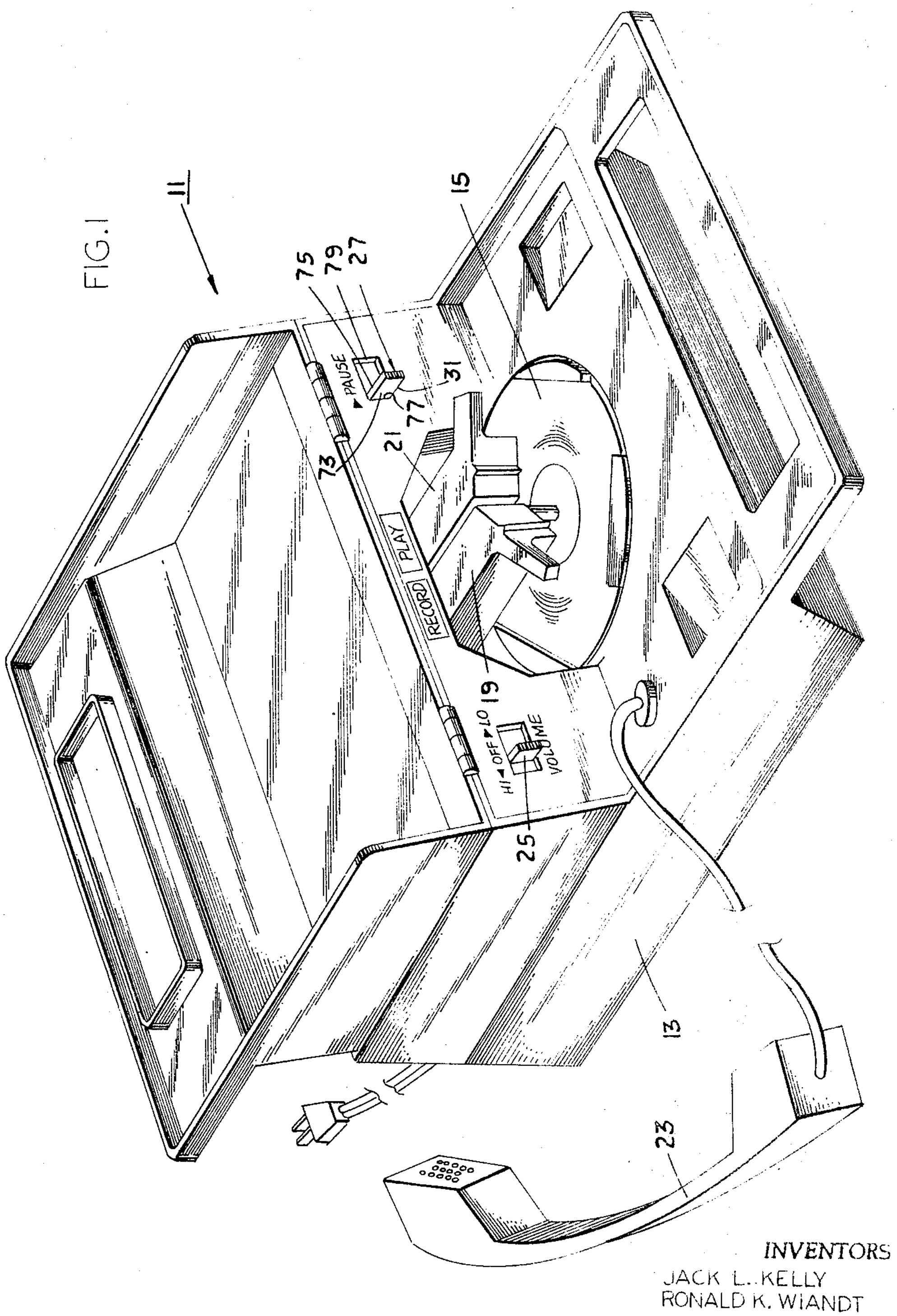
FIG. 1 is a perspective view of an embossable disc-type recording and reproducing device embodying one form of the present invention.

Referring in detail to the drawings, and in particular to FIG. 1 thereof, there is shown a disc-type recording and reproducing device 11 embodying one form of our invention. The recording device 11 essentially comprises a three-part housing 13 wherein the turntable 15 and its driving motor (not shown) are located, recording arm 19 and its associated recording head, playback arm 21 and its associated playback head, an amplifier (not shown), a combination speaker-microphone type of handset 23, and control knob 25. Knob 25 represents the "on-off" and "volume" control means, since it may be pushed to the left or to the right to selectively energize the amplifier and to selectively vary the volume from a "high" position to a "low" position.

To effectively and economically couple and decouple the motor to the turntable 15, and thereby facilitate the desired momentary interruption of the turntable 15, in accordance with our invention, there is provided the "pause" control element 27. As shall become apparent hereinafter, element 27 is a novel multifunctional device.

For a better understanding of the structure and utilization of pause control element 27, attention is first directed to FIGS. 2 to 5. As shown therein, the control element 27 comprises a slidable upper body 29, a handle 31 protruding forwardly therefrom, lower working surface sections 33 and 35 connected to the bottom of body 29 by inclined wall 37, bottom flange 39 (FIG. 3) connected to the bottom of sections 33 and 35 and an elongated vertical strengthening rib 41 for structurally integrating the aforementioned element sections into a strong and efficient overall unit.

Figures 2, 3, 4, 5:
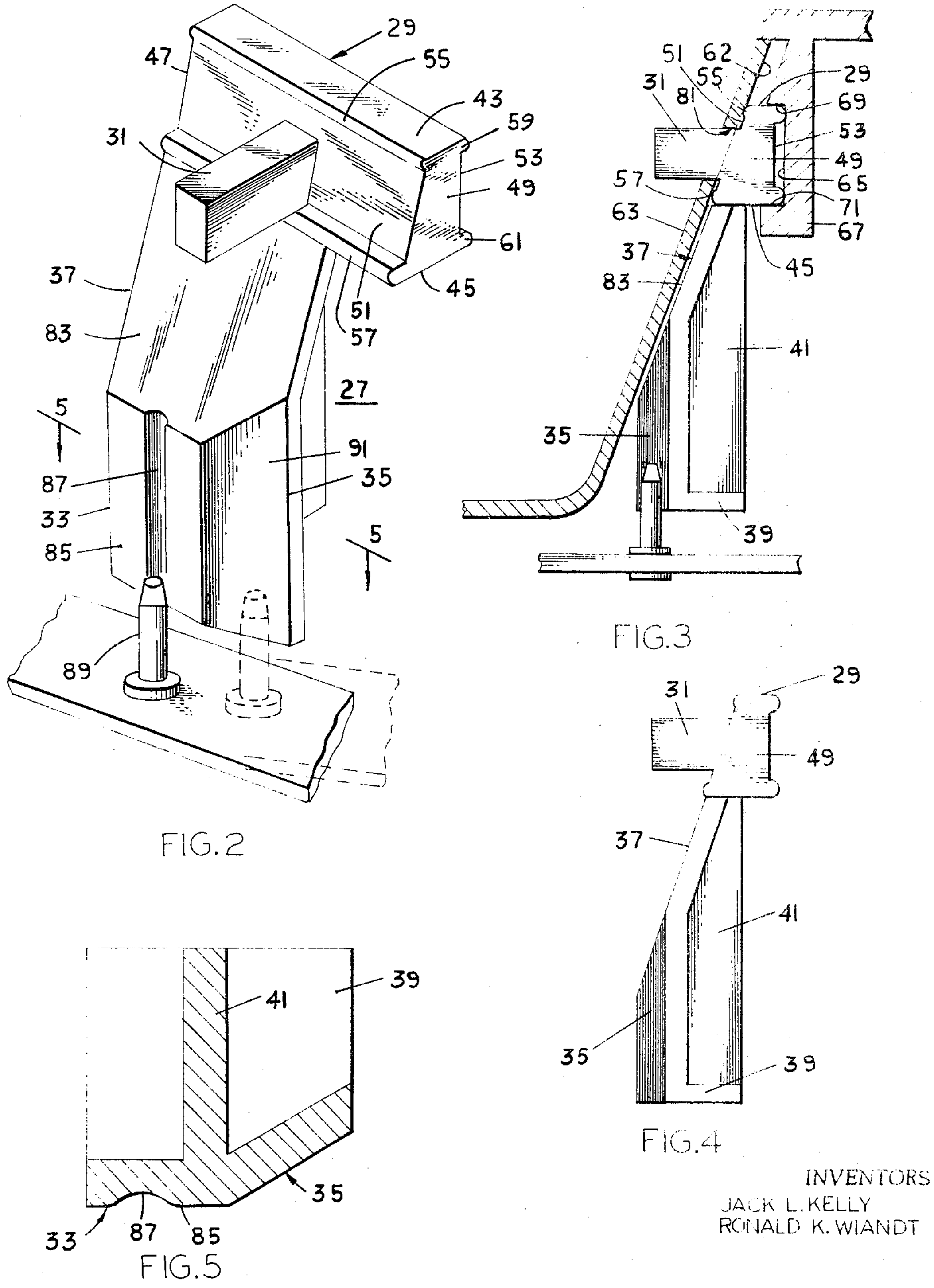
FIG. 2 is a frontal perspective view of the multifunctional pause element of the device of FIG. 1.
FIG. 3 is a right side view of the pause element shown in FIG. 2, the element arranged in its sliding environment, sectionally illustrated portions of the device housing.
FIG. 4 is a view similar to FIG. 3, but showing the pause element by itself.
FIG. 5 is a transverse sectional view, taken generally along the line 5—5 of FIG. 2 to show the actuating and detent portions of the pause element in further detail.

The slidable upper body 29 of element 27, as shown in FIG. 3, is generally shaped like a trapezoid to include elongated top 43 and elognated bottom 45, the elongated bottom 45 being parallel to, deeper than and the same elongated length as top 43. The parallel top 43 and bottom 45 of upper body 29 are connected at their ends to left and right vertical sides 47 and 49 respectively, and at their front and rear to inclined front 51 and vertical rear 53.

It will be noted from viewing FIG. 2 that there is an elongated pair of cylindrically configured horizontal ribs 55, 57 formed respectively on front 51, at its top and bottom. On vertical rear 53 of the upper body 29, the cylindrically configured ribs 59, 61 are formed respectively at its top and bottom. The cylindrically configured front ribs 55, 57 each provide linear sliding contact with the rear surface 62 of inclined front wall 63, when pause control element 27 is positioned within housing 13 and concurrently the cylindrically configured rear ribs 59, 61 each provide linear sliding contact with slot 65 on depending wall 67 of the housing 13. By means of the elongated horizontal ribs 55, 57, 59, 61, relatively low frictional resistance by the housing 13 to element 27 is effectively implemented during the sliding manipulation of element 27. It will be understood by those skilled in the art that ribs 55, 57, 59, 61 only control lateral movement of element 27 in a direction between the front and rear of element 27. Control of relative movement of element 27 in a vertical direction with respect to housing 13, is achieved by sliding engagement of top 29 (near rib 59) with a downwardly facing surface 69 of housing slot 65 and by sliding engagement of bottom 45 (near rib 61) with an upwardly facing surface 71 of housing slot 65.

For limiting the sliding movement of pause element 27 between its "off" (extreme left as shown in FIG. 1) and its "on" position (extreme right, opposite to that shown in FIG. 1), the rectangular handle 31 of element 27 has two opposed vertical sides 73 and 75 which respectively engage the vertical extremities 77 and 79 of a housing slot 81 (FIG. 3). Handle 31 protrudes outwardly and forwardly from slot 81 for ready manipulation by the operator of the device to either activate or inactivate the pause mechanism.

As further shown in FIGS. 2 and 3, there is formed integrally to the elongated bottom 45 of element upper body 29, the inclined wall 37. Wall 37 extends downwardly and forwardly from bottom 45 (viewing FIG. 2) in such a manner that its frontal surface 83 is parallel to front wall 63 of the housing 13. From viewing FIG. 3, it will thus be seen that when pause element 27 is seated in its sliding position in the housing of the device, the upper body 29 of the element is snugly ensconced between housing slot 65 and rear surface 62 of housing front wall 63, with front ribs 55, 57 engaging surface 62 and sliding thereupon, and with the frontal surface 83 and surface 51 each disposed in spaced apart contiguity and parallel to the inclined surface 62.

At its bottom, the inclined wall 37 of the pause element 27 is connected to the working surface sections 33, 35. Section 33 is conterminous to the left side of the bottom of inclined wall 37 (viewing FIG. 2), and its front surface 85 is a working surface, providing therein a partially cylindrical elongated groove 87 for detenting coaction with stud 89. Front surface 85 is disposed in a generally vertical plane (FIG. 2), parallel to the front of the housing, and the groove 87 extends with uniformity from the top of surface 85 to the bottom thereof.

Section 35 is conterminous at its top to the right side of the bottom of inclined wall 37 (viewing FIG. 2), and its front surface 91 performs a camming function in cooperation with stud 89, as will be explained in further detail hereinafter. Surface 91 is also conterminous with the right vertical border of surface 85 (viewing FIG. 2) and inclined laterally relative to surface 85 so that when the pause element 27 is seated in housing 13, surface 91 extends rearwardly and to the right of surface 85 at an angle approximating 30 degrees from the general plane of surface 85.

As previously mentioned, the bottoms of working sections 33 and 35 are connected to the bottom flange 39 (FIG. 3). Flange 39 helps to mechanically reinforce the structural angular relationship of working sections 33, 35 from the rear thereof and enhance the ruggedness and long life of the pause element and the overall device. Flange 39 also prevents stud 89 from being assembled behind section 35. The vertical strengthening rib 41 (FIG. 3), which has also been mentioned hereinbefore, extends lengthwise in a vertical direction from the bottom 45 of the upper body 29 to the top of flange 39 (see FIG. 3). Rib 41 also enhances the operative ruggedness and long life of the pause element 27 and the overall device 11.

Figures 6, 7:
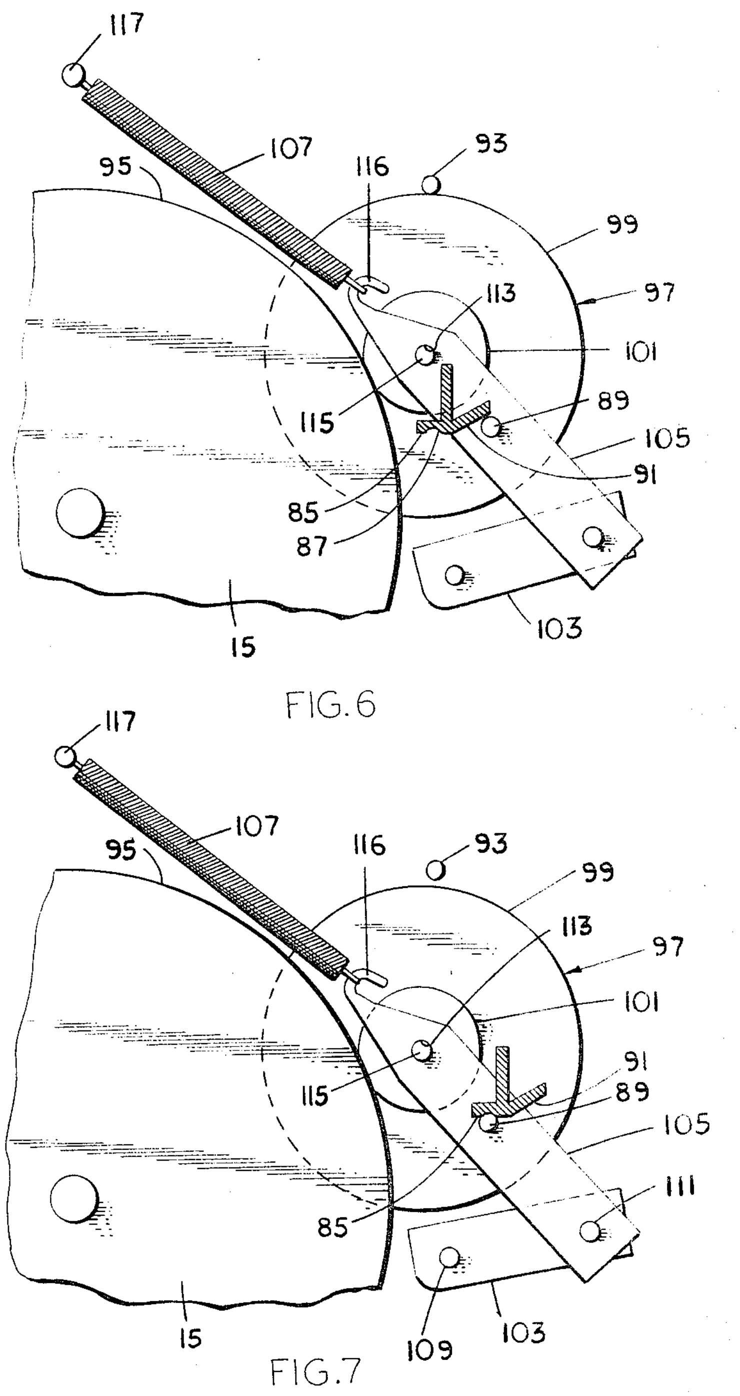
FIG. 6 is a fragmentary view of the turntable driving mechanism of the device of FIG. 1, showing the pause element in its "off" position and the motor driven pinion in driving engagement with the turntable.
FIG. 7 is a view similar to FIG. 6, with the pause element in its "on" position and the motor driven pinion disengaged from the turntable.

Turning now to FIGS. 6 and 7, it is illustrated therein how pause element 27 of the present invention cooperates with a mechanism to selectively inactivate or activate the turntable 15. More particularly, motor driven pinion 93 rotates clockwise (viewing FIG. 6), and it is in indirect driving engagement with the periphery 95 of turntable 15 via an idler wheel 97. Thus, idler wheel 97 includes an enlarged rubber wheel 99 for alternative frictional engagement with pinion 93, and a smaller rubber wheel 101 coaxial to the larger wheel 99 but spaced upwardly therefrom (viewing FIG. 6) for driving engagement with the periphery 95 of turntable 15.

For controlling the driving engagement or disengagement of pinion 93 with idler wheel 97 and thereby effecting a "pause" control for tuntable 15, links 103, 105 and tension spring 107 are utilized. Link 103 is pivotally mounted to the housing 13 via its stud 109, the stud 111 at the other end of link 103 being rotatively linked to an aperture of link 105 near its lower right end (viewing FIGS. 6 and 7). Link 105 also includes the aforementioned stud 89 which extends perpendicularly upwardly from its middle forward face, and an aperture 113 for permanently affixing the link 105 to a shaft 115 that rotatably couples idler wheel 97 on its axis. Aperture 113 is located on link 105 near its upper hooked end 116, between stud 89 and end 116. Tension spring 107 is connected at one of its ends to hooked end 116 of the link 105 and its other end is secured to a fixed stud 117 that is integral to the housing 13.

When handle 31 (FIG. 2) of the pause element 27 is in its left position (as shown in FIG. 1), the working surfaces 85 and 91 of element 27 are in the position shown in FIG. 6. Stud 89 is then near the upper right end of surface 91, and the force of spring 107 causes the engagement of enlarged wheel 99 of the idler 97 with pinion 93. The pinion 93 thus drives wheel 99 of idler 97 and smaller wheel 101 in turn drives the turntable 15. The device 11 may thus be used for either recording or playback, providing that the recording arm 19 and playback arm 21 are placed in their requisite positions with respect to the turntable 15.

When the operator of device 11 decides that he wants to interrupt the operation of the turntable 15 (e.g. to collect his thoughts while he is recording a "letter" type of communication), he then moves handle 31 (FIG. 2) of the pause element 27 to its right position (opposite to that shown in FIG. 1). The working surfaces 85 and 91 then move directly to the right from their FIG. 6 position to their FIG. 7 position. In the course of this sliding movement of pause element 27, the working surface 91 operates as a cam upon stud 89 to force the link 105 to move downward to the right about the axis of stud 111, from its FIG. 6 position. Enlarged idler wheel 99 thus moves downwardly and away from pinion 93 against the force of spring 107, and smaller idler wheel 101 continues to engage turntable 15, but no longer drives it. Thus, since the idler wheel 97 is no longer in concurrent engagement with both motor pinion 93 and turntable 15, the turntable 15 stops.

During the camming operation of stud 89 from its FIG. 6 to its FIG. 7 position, the idler wheel 97 is thus moved downwardly a small distance (viewing FIG. 6). As a result of this movement of the idler wheel 97, a tensional force is built up in spring 107. This tension force helps to restore the idler wheel 97 to its original driving position (FIG. 6) when the pause element 27 is operated back to its "on" position.

In the course of movement of pause element 27 from its FIG. 6 position to its FIG. 7 position, the camming surface 91 rides into stud 89 and slides thereacross with a resultant camming effect upon stud 89. When the connective border between the working surfaces 85, 91 is reached by the stud 89, the surface 85 slides tangentially across the cylindrical stud 89, until the stud reaches groove 87. Spring 107 exerts a light but sufficient force upon the link 105 to enable the stud 89 to become seated snugly in groove 87. This is the detented position for the element 27, and the coaction between stud 89 and groove 87 thus securely retains the driving mechanism in its "pause" condition.

When the operator decides to restart the turntable 15 after its de-energization via the "pause" control, all he needs to do is to move handle 31 back to its extreme left position. The working surfaces 85, 91 are thereupon moved directly to the left (viewing FIG. 1). In the course of this movement of element 27, the light detenting force of spring 107 is readily overcome by the manual force exerted upon handle 31. As soon as the connective border between the working surfaces 85, 91 is reached by the stud 89, the inclined surface 91 thereupon begins to allow the stud 89 to move upwardly. Spring 107 then initiates the reverse movement of link 105, so that larger wheel 99 reengages pinion 93. The idler wheel 97 is then again in concurrent engagement with motor pinion 93 and turntable 15, and the turntable is returned to operation.

It will now, therefore, be seen that the new and improved pause control mechanism is novel in operation, and extremely simplified in construction. It will also be understood that our novel control element is very economical in cost and lends itself readily to mass-production techniques.

While in accordance with the patent statutes, we have described what at present is considered to be the preferred embodiment of this invention, it will be obvious to those skilled in the art that various changes and modifications may be made therein without departing from this invention, and therefore, we aim in the following claims to cover all such equivalent variations as fall within the true spirit and scope of this invention.

What we claim as new and desire to secure by Letters Patent of the United States is:

1. In a phonograph system, a support, a turntable arranged on said support, said turntable having its top disposed in a horizontal plane, a motor driven element disposed on said support, means for transmitting motion from said driven element to said turntable, and a control element slidably movable between an "inactive" position and a "pause" position in a direction parallel to the plane of the top of said turntable for operating said motion transmission means into and out of concurrent engagement with said turntable and said motor driven element thereby to selectively drive said turntable, said control element being of unitary construction and comprising a manually engageable first handle portion, a second portion having a trapezoidal configuration for slidably movable cooperation with a sloped front wall and an associated slot of said support, a third portion having a camming surface formed thereon for coaction with said motion transmission means thereby to operate said means into or out of concurrent engagement with said turntable, and a fourth portion having a detent groove formed thereon for coaction with an actuator stud of said motion transmission means when said control element is slidably located in "pause" position thereby to retain said control element in its "pause" position.

2. The phonograph system of claim 1 wherein said motion transmission means includes a spring biased movable link having said stud projecting therefrom; said detent groove of said fourth portion of said element having a partially cylindrical configuration, said stud of said motion transmission means being cooperably received by said groove when said control element is operated to its "pause" positon from its inactive position thereby to detent said control element in its "pause" position.

3. The phonograph system of claim 1 wherein the third and fourth portions of said control element are spaced substantially from, forwardly of and underneath said second portion of said element.

References Cited

UNITED STATES PATENTS

| | | | |
|---|---|---|---|
| 3,336,031 | 8/1967 | Ammon et al. | 274—2 |
| 3,044,784 | 7/1962 | Vitale | 274—39 |
| 3,398,962 | 8/1968 | Faulkner | 274—9 |

LEONARD FORMAN, Primary Examiner

S. L. STEPHAN, Assistant Examiner

U.S. Cl. X.R.

274—1, 10